2 Sheets—Sheet 1.
J. M. SEGUR.
HAND CORN PLANTER.
No. 11,094. Reissued July 8, 1890.
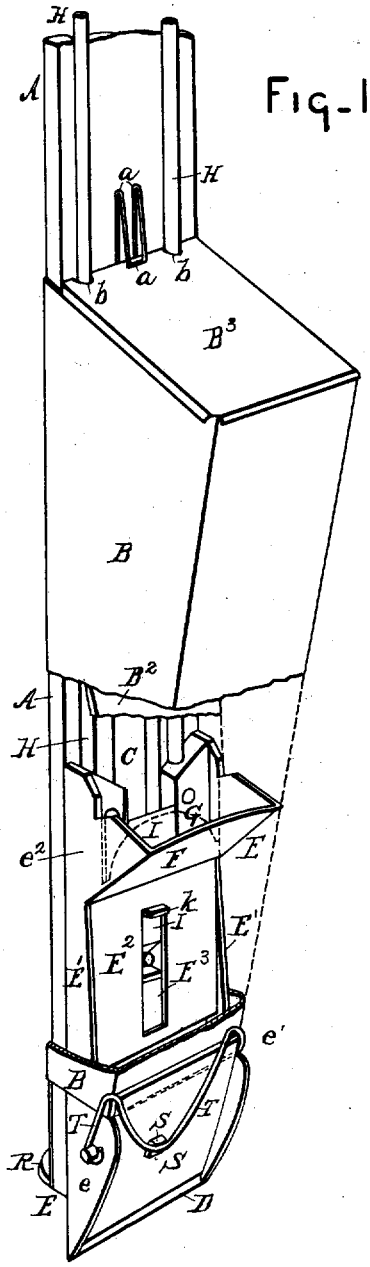
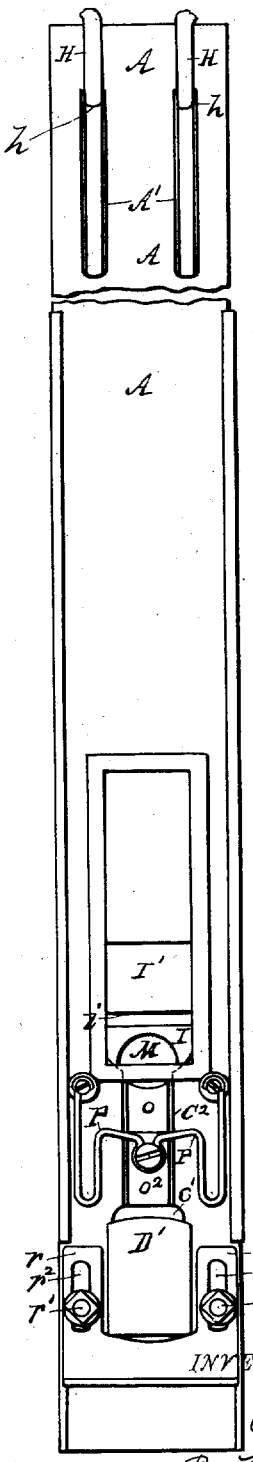
WITNESSES
F. Clough
C. J. Shipley
INVENTOR
Joseph M. Segur
By Mills & Leggett & Co
Attorneys.
THE NORRIS PETERS CO., PHOTO-LITHO., WASHINGTON, D. C.

2 Sheets—Sheet 2.

J. M. SEGUR.

HAND CORN PLANTER.

No. 11,094. Reissued July 8, 1890.

WITNESSES

F. Clough

C. J. Shipley

INVENTOR

Joseph M. Segur

By Mills & Leggett & Co

Attorneys.

THE NORRIS PETERS CO., PHOTO-LITHO., WASHINGTON, D. C.

UNITED STATES PATENT OFFICE.

JOSEPH M. SEGUR, OF ADRIAN, MICHIGAN.

HAND CORN-PLANTER.

SPECIFICATION forming part of Reissued Letters Patent No. 11,094, dated July 8, 1890.

Original No. 393,670, dated November 27, 1888. Application for reissue filed March 5, 1890. Serial No. 342,823.

*To all whom it may concern:*

Be it known that I, JOSEPH M. SEGUR, a citizen of the United States, residing at Adrian, in the county of Lenawee and State of Michigan, have invented certain new and useful Improvements in Hand Corn-Planters; and I do hereby declare the following to be a full, clear, and exact description of the invention, such as will enable others skilled in the art to which it appertains to make and use the same.

My invention relates to improvements in hand corn-planters; and it consists in a certain novel construction, arrangement, and combination of the various parts, all of which I will now proceed to point out and describe, reference being had to the accompanying drawings, in which—

Figure 5:
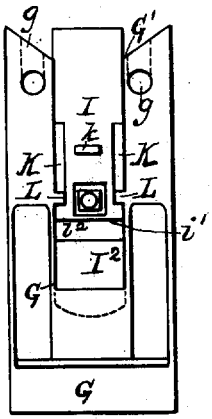
Figure 6:
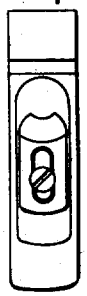
Figure 3:
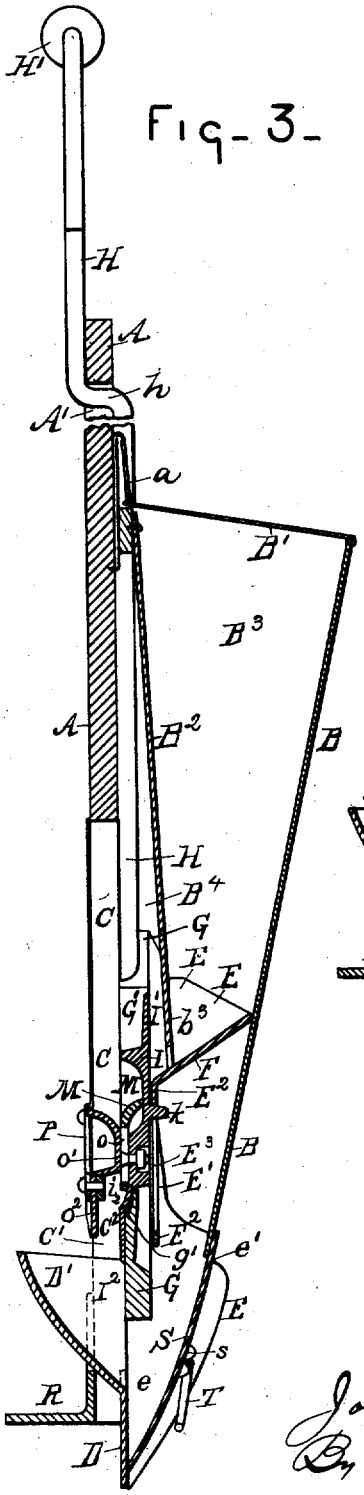
Figure 4:
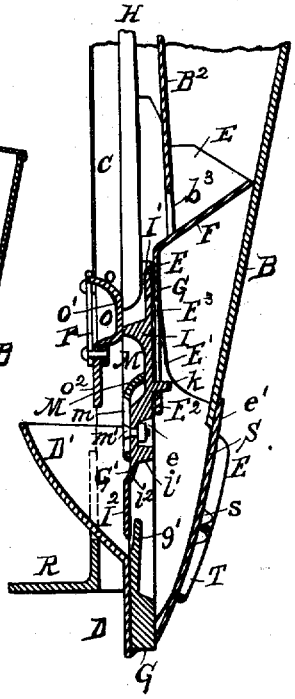

Figure 1 is a perspective of my improved planter, part of the hopper being broken away. Fig. 2 is a front elevation of the same; Fig. 3, a vertical central section; and Figs. 4, 5, and 6 are details of various parts of my said invention.

Referring to said drawings, A represents the standard; B, a hopper, of ordinary construction, secured to the sides of the standard and having its lower end open. Said hopper is preferably made of sheet metal.

B′ is a top or lid for said hopper, hinged to its outer edge and held closed by means of a spring *a*, attached to the standard. The lower end of the standard is slotted, so as to form the upper and lower apertures C and C′ and intermediate contracted aperture $C^2$.

D is a flat metal plate secured to and projecting below the lower end of the standard. The upper portion of said plate is slotted.

D′ is an inclined seed-passage formed integral with the plate and communicating with the slot in the same. Said seed-passage projects through the lower aperture C′ and extends up through the contracted portion of the slot. The upper end or mouth of the seed-passage is open, and is adapted to receive the seed when discharged from the measuring-cup, as hereinafter described.

E is a casting, which consists of the side plates E′, connected by the flat plate $E^2$, which, when the casting is in position, is parallel with the inner face of the standard. The edges of the plates E′ next to the standard are formed in a straight line and rest against the inner face of said standard and extend down on each side of the plate D to its lower end, the outer faces of said plates being flush with the edges of the standard. The lower ends of the plates E′ are extended and form wings *e*, projecting below the hopper on each side of the plate D, said wings substantially forming a continuation of the sides of the hopper, the lower end of said hopper engaging with shoulders *e′* formed in said side plates. The upper ends $e^2$ of the side plates are extended, so as to engage with the outer side of the hopper, and are connected by a plate, which extends from the upper end of the plate $E^2$ to the outer side of the hopper, forming an inclined bottom F for said hopper, which communicates with the aperture C. Said aperture C is covered by a plate of glass or isinglass. The casting E is thus held secured to the lower end of the standard by the hopper, said casting being located partially within said hopper.

G is a plunger, preferably formed of metal and mounted between the side plates E′, plate $E^2$, and standard A.

G′ is a slot in the upper portion of the plunger, of the same width as the aperture or slot C. The lower end of the plunger rests on the plate D, and is cut away so as to accommodate it to said plate. In the upper corners of the plunger are formed two curved grooves *g*, in which are secured the bent ends of the plunger-rods H, which extend up along the side of the standard within the hopper. Said rods pass out through apertures *b* in the inner edge of the top or lid B′.

A′ are two parallel longitudinal slots in the upper end of the standard. Through these slots the plunger-rods pass, and are then bent up parallel with and resting close against the opposite side of the standard. This bent portion of the rods forms shoulders or stops *h*, which limit the upward and downward movement of the plunger-rods and plunger as said stops come in contact with the top or bottom of said slots. The upper ends of the rods are connected by a handle H′. It will thus be seen that when the plunger-rods are passed through the slots in the standard and their lower ends secured to the plunger they require no further fastening to secure them to the standard and hold them in an operative position.

I is a slide mounted in the slot G′ between the plate $E^2$ and the portion of the standard on each side of the contracted aperture $C^2$.

K K are grooves on each side of the slide, with which lugs L L on the sides of the slot G′ engage.

*k* is a projection or lug on the slide, which engages with a slot $E^3$ in the plate $E^2$. On the face of the slide approximate to the standard is formed a seed-measuring cup M, having an adjustable block M′ in one end, provided with a slot *m*, and secured to the slide by a set-screw *m′*, by means of which the block can be adjusted so as to regulate the capacity of the measuring-cup.

The upper end I′ of the slide, above and on the same side as the measuring-cup, is cut away, forming a beveled shoulder *i* immediately above said cup. The lower end $I^2$ of the slide, below and on the opposite side from the measuring-cup, is also cut away, forming a shoulder *i′*. Immediately below this shoulder is a slightly-raised portion $i^2$, which enters a recess *g′* in the plunger immediately below the slot G′, when said plunger is on its upward stroke, the lower end of the slot engaging with the shoulder $i^2$, and the lugs L L, engaging with the upper ends of the grooves K K, carry said slide up with said plunger, so that the seed-cup in the same communicates with the upper aperture C. On the downward movement of the plunger the slide does not start to move down until the lugs L L engage with the lower ends of the grooves K K. The slide is then carried down with said plunger. When said slide has reached the slot in the plate D, it enters the slot in the same, and the surface of its lower end $I^2$ next to the plunger, is about flush or a little below the surface of the plate.

O is a rigid metal cut-off located in the contracted portion of the slot $C^2$. Said cut-off is composed of the bent portion *o*, presenting a flat surface *o′* to the seed-measuring cup, and a straight end $o^2$, to which is secured a spring P, the ends of which are secured to the standard on each side of the slot. From the description of the plunger and slide and their operation it will be seen that there is considerable lost motion between said plunger and slide and that the play of the slide is much less than that of the plunger. It will therefore readily be seen that it requires but a small cut-off surface *o′* to separate the corn in the cup from that in the hopper, and that there is much less liability of the kernels becoming wedged between said cup and cut-off than when the measuring-cup has a play equal to the plunger, and the cut-off surface has to be lengthened to correspond with this play. This is an important feature of my invention, and in the construction I have described I produce a planter in which it is almost impossible for the seed-corn to become wedged between the cut-off and measuring-cup.

In the hopper B, I arrange a partition $B^2$, extending from the standard at a point near the top of said hopper to the inclined bottom F near its center, thus dividing the hopper into two compartments $B^3$ and $B^4$. In the lower end of the partition is an aperture $b^3$, through which the corn passes from the compartment $B^4$, and from thence to the measuring-cup. This prevents the corn from becoming wedged in the bottom of the hopper around the measuring-cup so as to prevent the plunger from being operated.

R is an adjustable stop, having arms *r* extending up on each side of the seed-passage and secured to the standard by bolts *r′*, provided with clamping-nuts and passing through slots $r^2$ in said arms. This stop can be moved up or down so as to regulate the depth of planting.

S is a reversible scraper-plate located between the wings *e* and having one end resting on the lower end of the hopper and its other end resting on the plate D.

T is a spring having its ends secured to studs on the outside of the wings *e* and its central portion engaging with a notched lug *s*, secured about the center of the outside of the scraper-plate, and holds the same in position.

The operation of my invention is as follows: The corn is placed in the compartment $B^3$ of the hopper and passes through the aperture $b^3$ to the compartment $B^4$. On the upward stroke of the plunger the slide I is lifted and its upper end I′ passes through the corn in the bottom of the compartment, thus stirring it up and preventing it from choking at the bottom of the hopper. When the plunger has reached the upward limit of its stroke, the measuring-cup is in communication with the compartment $B^4$, or more directly with the upper aperture C in the standard. Such corn then as has fallen over the top of the slide rests between said slide and the standard, and also in the aperture C, from which the measuring-cup is filled. On the downward stroke of the plunger said plunger moves in advance of the slide until its lugs L L engage with the lower ends of the grooves in said slide, when it is carried down and the measuring-cup moved past the cut-off O. When the cup passes said cut-off, it empties the corn into the seed-passage D′, the discharge end of the seed-passage being closed by the lower end of the slide I. On the next upward stroke of plunger the discharge end of the seed-passage is opened and the seed falls between the scraper and plate D, which is between the wings *e*. On the next downward stroke of the plunger the lower end of said plunger forces the lower end of the scraper open and discharges the corn into the ground.

It will be seen that the plunger has sufficient play to get above the corn which is between the scraper and plate D, at the same time the slide in which the measuring-cup is located has very much less play, and it is therefore necessary to have but a short cut-off to close said cup, thus rendering it almost impossible for the corn to become wedged in between the cut-off and measuring-cup. By dividing the hopper into two compartments I also prevent the corn from choking in the bottom of the same. By means of the transparent covering of the aperture C the operator can at all times tell if the compartment $B^4$ is being supplied with the proper amount of seed, and also ascertain if the measuring-cup is being properly filled at each stroke of the planter. This transparent covering forms substantially a "sight-feed" device for the planter.

The peculiar construction of the plunger-rods enables me to dispense with any guides or fastenings to secure them to the standard, and the shoulders formed by bending the same and passing them through the slots in the standard form an effective and strong stop which limits the movement of the plunger.

Having thus fully described my invention, I claim as new and desire to secure by Letters Patent—

1. In a hand corn-planter, the combination, with a standard and a hopper secured thereto, of a plunger consisting of two parts jointed or hinged together, whereby said plunger will conform itself to its bearings, said plunger having in its lower portion a seed-measuring cup adjacent to and opening toward the standard, and an opening in said standard whereby the cup may communicate with the hopper, substantially as described.

2. In a hand corn-planter, a scraper-plate, in combination with a spring T, bearing on said plate, the extremities of said spring folded upon themselves and engaged with opposite sides of the planter, whereby the resiliency of the spring keeps the scraper-plate to its work, and a seed-cup-carrying plunger, which in its descent opens the scraper-plate, substantially as described.

3. In a hand corn-planter, a standard A, having an opening therethrough, and a hopper B, projecting from one of its faces, a plunger carrying a seed-cup adjacent to the standard moving parallel with said standard and opening in a direction toward the standard, and a transparent panel at the rear of the standard covering the opening through the standard opposite the seed-cup, substantially as described.

4. In a hand corn-planter, the standard A, provided with an opening therethrough, and a hopper B, projecting from one of its faces, a partition in said hopper with a passage-way through the said partition at its lower extremity for the grain, a plunger carrying a seed-cup back of the said partition moving parallel with the standard and opening toward the standard, and a transparent panel covering the opening through the standard opposite said seed-cup and passage, substantially as described.

5. In a hand corn-planter, the combination, with a standard, a hopper secured thereto, and a plunger mounted in suitable guides in said hopper and having a longitudinal slot therein, of a slide loosely mounted in the slot in the plunger and having a seed-measuring cup in said slide, all constructed, arranged, and operating substantially as described, whereby the play of the plunger is greater than that of the slide, for the purpose set forth.

6. In a hand corn-planter, the combination, with a standard having a slot in its lower end, a cut-off located in said slot, a hopper secured to the standard, and a plunger mounted in suitable guides within the hopper and having a longitudinal slot in its upper portion, of a slide mounted in the slot in the plunger and having a seed-measuring cup formed in its face next to the cut-off and provided with longitudinal grooves in each side, and lugs on the sides of the slot in the plunger mounted in the grooves in the slide and adapted to reciprocate the slide as said lugs engage alternately with opposite ends of the grooves as the plunger is operated, all constructed, arranged, and operating substantially as shown and described, whereby the plunger will have a greater play than the slide, for the purpose set forth.

7. In a hand corn-planter, the combination, with a standard having a slot in its lower end, a hopper secured to said standard, a cut-off located in the slot in the standard, an inclined seed-passage projecting through the slot in the standard below the cut-off and on the side of the standard opposite the hopper, a plunger mounted in suitable guides within the hopper and having a longitudinal slot in its upper portion, and lugs on each side of said slot, of a slide mounted in the slot in the plunger and having a seed-measuring cup in its face next to the cut-off, and provided with longitudinal groves on each side of the slide with which the lugs on the plunger engage, all constructed, arranged, and operating substantially as shown and described, whereby the plunger will have more play than the slide carrying the seed-cup, for the purpose set forth.

8. In a hand corn-planter, the combination, with a standard having a slot in its lower end and the cut-off located in said slot, a hopper secured to the standard, and a plunger G, mounted in suitable guides within the hopper and having a longitudinal slot G′ in its upper portion provided with lugs L L on each side, of a slide I, mounted in said slot and having the grooves K K on each side, on which the lugs L L are mounted, and provided with a seed-measuring cup M on its face next to the cut-off, all constructed, arranged, and operating substantially as shown and described, as and for the purpose set forth.

9. In a hand corn-planter, the combination, with the standard A, having a longitudinal slot in its lower end, the cut-off O, located in said slot, the hopper B, secured to the standard, the seed-feed passage D′, projecting through the lower end of the standard below the cut-off and on the opposite side from the hopper, the casting E, secured to the standard and having the cross-plate $E^2$ within the lower end of the hopper, the plunger G, mounted between the plate $E^2$ and standard and having the longitudinal slot G′, and lugs L L on each side of said slot, of the slide I, mounted in said slot G′ and having grooves K K on each side, by which the lugs L L are mounted, and provided with a seed-measuring cup M in its face next to the cut-off and having its upper end I cut away on the same side as the measuring-cup, and its lower end $I^2$ cut away on the side opposite to the measuring-cup, all constructed, arranged, and operating substantially as shown and described.

10. In a hand corn-planter, the combination, with the standard A, having a longitudinal slot in its lower end, the cut-off O, located in said slot, the hopper B, secured to the standard, the plate D, secured to and projecting below the lower end of the standard and having its upper end slotted, the seed-feed passage D′, formed integral with said plate and projecting through the lower end of the standard and below the cut-off, the casting E, having the side plates E′ extended to form wings *e*, projecting below the standard on each side of the plate D, and the cross-plate $E^2$ and inclined bottom F of the hopper B, of the plunger G, mounted between the plate $E^2$ and standard and having the slot G′ and lugs L L on each side of the slot, the slide I, mounted in said slot, and grooves K K on each side, with which the lugs engage, and provided with a seed-measuring cup M on its face next to the cut-off, plunger-rods H, connected with the plunger, and a scraper-plate S, held between the wings *e* by a spring T, all constructed, arranged, and operating substantially as shown and described.

11. In a hand corn-planter, the combination, with the standard A, having a longitudinal slot in its lower end, consisting of the upper aperture C, closed by a transparent material, the lower aperture C′ and intermediate aperture $C^2$, the rigid metal cut-off O, located in the contracted portion $C^2$ of the slot, the spring P, holding the same in position, the hopper B, secured to the standard, and the seed-passage D′, passing through the aperture C′ to the side of the standard opposite the hopper, of the plunger G, mounted in bearings within the hopper and having the longitudinal slot G′ and lugs L L on each side of the slot, and the slide I, mounted in said slot G′ and having grooves K K in each side, with which the lugs L L engage, and provided with a seed-measuring cup on its face next to the cut-off, all constructed, arranged, and operating substantially as shown and described.

12. In a hand corn-planter, the combination, with a standard A, having parallel grooves A′ in its upper end and a hopper B, secured to said standard, of a plunger mounted in suitable guides within said hopper, and plunger-rods H, secured to the upper end of the plunger and bent to form shoulders or stops *h* and extending through the slots A′ in the standard, all constructed, arranged, and operating substantially as shown and described, whereby the shoulders *h* will engage with the ends of the slots A′ and limit the movement of the plunger.

13. In a hand corn-planter, the combination of a standard, a hopper divided by a partition into two compartments and having an aperture in the lower end of the partition connecting the compartments, and a plunger provided with a seed-measuring cup adapted to communicate with the compartment of the hopper adjacent to the standard, all constructed, arranged, and operating substantially as shown and described.

14. In a hand corn-planter, the combination of a standard A, a hopper B, secured thereto and having an inclined bottom F, and a partition $B^2$, dividing the hopper into two compartments $B^3$ and $B^4$, and having an aperture $b^3$ in its lower end connecting the compartments $B^3$ $B^4$, and a plunger having a seed-measuring cup adapted to communicate with the compartment $B^4$ as said plunger is reciprocated, all constructed, arranged, and operating substantially as shown and described.

In testimony whereof I affix my signature in presence of two witnesses.

JOSEPH M. SEGUR.

Witnesses:
M. A. REEVE,
W. H. CHAMBERLIN.